United States Patent
Kato et al.

(10) Patent No.: US 12,412,966 B2
(45) Date of Patent: Sep. 9, 2025

(54) POWER STORAGE DEVICE

(71) Applicant: TOYOTA JIDOSHA KABUSHIKI KAISHA, Toyota (JP)

(72) Inventors: Masashi Kato, Konan (JP); Mizuho Matsumoto, Toyota (JP); Hiroyuki Nakayama, Okazaki (JP); Daiki Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 699 days.

(21) Appl. No.: 17/688,038

(22) Filed: Mar. 7, 2022

(65) Prior Publication Data

US 2022/0320693 A1    Oct. 6, 2022

(30) Foreign Application Priority Data

Mar. 31, 2021  (JP) ................. 2021-060593

(51) Int. Cl.
*H01M 10/0585* (2010.01)
*H01M 10/0525* (2010.01)
(Continued)

(52) U.S. Cl.
CPC ....... *H01M 50/54* (2021.01); *H01M 10/0525* (2013.01); *H01M 10/0585* (2013.01); *H01M 50/505* (2021.01)

(58) Field of Classification Search
CPC ............. H01M 50/54; H01M 10/0525; H01M 10/0585; H01M 50/505; H01M 50/124;
(Continued)

(56) References Cited

U.S. PATENT DOCUMENTS

2006/0257732 A1  11/2006  Yageta et al.
2013/0196211 A1   8/2013  Park et al.
(Continued)

FOREIGN PATENT DOCUMENTS

CN      103125034 A      5/2013
EP      1291934 A2 *     3/2003    ........ H01M 10/0436
(Continued)

*Primary Examiner* — Tiffany Legette
*Assistant Examiner* — Ignazio Macaluso
(74) *Attorney, Agent, or Firm* — Sughrue Mion, PLLC

(57) ABSTRACT

A power storage device includes power storage cells and a bus bar. Each power storage cell includes positive-electrode sheets, negative-electrode sheets, a positive-electrode current collector plate, a negative-electrode current collector plate, and a laminated film. The positive-electrode current collector plate includes a positive-electrode protrusion shaped to protrude from the laminated film, and the negative-electrode current collector plate includes a negative-electrode protrusion shaped to protrude from the laminated film. The power storage cells are stacked such that the positive electrode protrusion in one power storage cell and the negative-electrode protrusion in another power storage cell adjacent to the one power storage cell face each other in the one direction. The bus bar is shaped to extend in the one direction and connects the positive-electrode protrusion to the negative-electrode protrusion.

1 Claim, 6 Drawing Sheets

(51) Int. Cl.
*H01M 50/505* (2021.01)
*H01M 50/54* (2021.01)

(58) Field of Classification Search
CPC .. H01M 50/178; H01M 50/503; H01M 50/51; H01M 50/548; H01M 50/553; H01M 50/507; H01M 50/533; H01M 50/249; H01M 50/502; H01M 50/547; H01M 50/557; H01M 2220/20
See application file for complete search history.

(56) References Cited

U.S. PATENT DOCUMENTS

| | | | |
|---|---|---|---|
| 2015/0303415 | A1 | 10/2015 | Kayano et al. |
| 2017/0343615 | A1 | 11/2017 | Lee et al. |
| 2021/0242548 | A1 | 8/2021 | Lee et al. |

FOREIGN PATENT DOCUMENTS

| | | | |
|---|---|---|---|
| JP | 2005-190885 A | 7/2005 | |
| JP | 2013-536979 A | 9/2013 | |
| JP | 2018-503936 A | 2/2018 | |
| JP | 2018-49823 A | 3/2018 | |
| JP | 2019-169254 A | 10/2019 | |
| WO | 2007/063877 A1 | 6/2007 | |
| WO | 2014/073443 A1 | 5/2014 | |
| WO | 2020/116799 A1 | 6/2020 | |

\* cited by examiner

POWER STORAGE DEVICE

This nonprovisional application is based on Japanese Patent Application No. 2021-060593 filed on Mar. 31, 2021 with the Japan Patent Office, the entire contents of which are hereby incorporated by reference.

BACKGROUND

Field

The present disclosure relates to a power storage device.

Description of the Background Art

A power storage device including a plurality of power storage cells has conventionally been known. For example, Japanese Patent Laying-Open No. 2005-190885 discloses a laminated battery module including a plurality of lithium-ion batteries. Each of a pair of terminals of a lithium-ion battery includes an extension extending from a power generation element in one direction and a protrusion protruding laterally from the extension. The protrusions of the opposite terminals of a lithium-ion battery are bent in the opposite directions, so that a bent portion of a positive-electrode terminal is connected to a bent portion of a negative-electrode terminal of an adjacent lithium-ion battery in one side, and a bent portion of a negative-electrode terminal is connected to a bent portion of a positive-electrode terminal of an adjacent lithium-ion battery on the opposite side.

SUMMARY

In the laminated battery module disclosed in Japanese Patent Laying-Open No. 2005-190885, as the thickness (the number of stacked layers of an electrode body) of each power storage cell changes in accordance with, for example, a change in required output, the shape of the terminal (current collector plate) changes as well. It is thus required to prepare current collector plates having shapes varying in accordance with the thicknesses of the power storage cells. This results in cost increase.

An object of the present disclosure is to provide a power storage device that can accommodate changes in the thickness of each power storage cell while providing commonality of shape among current collector plates.

A power storage device according to an aspect of the present disclosure includes a plurality of power storage cells stacked in one direction, and a bus bar that electrically connects power storage cells of the plurality of power storage cells to each other. Each of the power storage cells includes a plurality of positive-electrode sheets stacked in the one direction, a plurality of negative-electrode sheets stacked in the one direction, a positive-electrode current collector plate connected to the plurality of positive-electrode sheets, a negative-electrode current collector plate connected to the plurality of negative-electrode sheets, and a laminated film covering the plurality of positive-electrode sheets, the plurality of negative-electrode sheets, a part of the positive-electrode current collector plate, and a part of the negative-electrode current collector plate. The positive-electrode current collector plate includes a positive-electrode protrusion shaped to protrude from the laminated film in an orthogonal direction orthogonal to the one direction. The negative-electrode current collector plate includes a negative-electrode protrusion shaped to protrude from the laminated film in the orthogonal direction. The plurality of power storage cells are stacked such that the positive-electrode protrusion in one power storage cell among the plurality of power storage cells and the negative-electrode protrusion in another power storage cell adjacent to the one power storage cell among the plurality of power storage cells face each other in the one direction. The bus bar is shaped to extend in the one direction and connects the positive-electrode protrusion to the negative-electrode protrusion.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
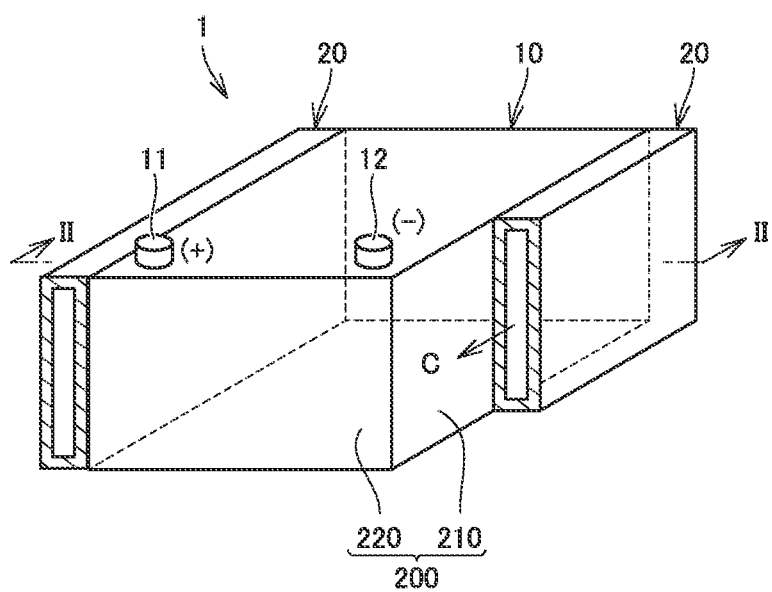
FIG. 1 is a perspective view schematically showing a configuration of a battery pack including a power storage device of Embodiment 1 of the present disclosure.

Embodiments of the present disclosure will be described with reference to the drawings. The same or corresponding elements in the drawings have the same reference characters allotted in the figures referenced below.

Embodiment 1

Figure 2:
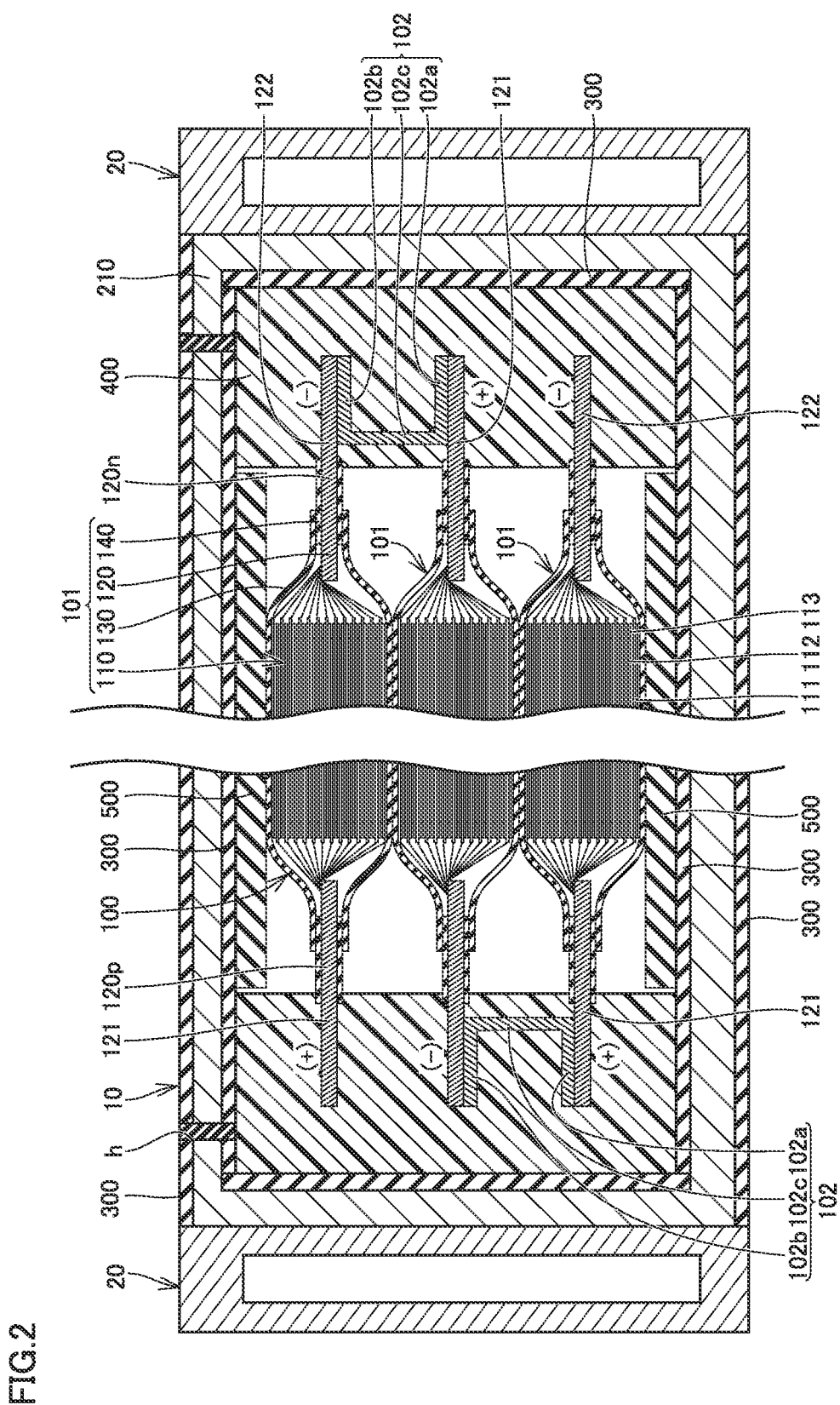
FIG. 2 is a sectional view taken along the line II-II in FIG. 1.

FIG. 1 is a perspective view schematically showing a configuration of a battery pack including a power storage device of Embodiment 1 of the present disclosure. FIG. 2 is a sectional view taken along the line II-II in FIG. 1. A battery pack 1 is mounted on, for example, an electric-powered vehicle such as a battery electric vehicle.

As shown in FIGS. 1 and 2, battery pack 1 includes a power storage device 10 and a cooling device 20. Cooling device 20 is a device that cools power storage device 10. Cooling device 20 is placed to be in contact with a lateral portion of power storage device 10. As shown in FIG. 1, cooling device 20 is configured to allow a cooling medium (such as water) C to flow therein. FIG. 1 shows a state in which a part of cooling device 20 is missing.

As shown in FIG. 1, power storage device 10 includes a pair of external terminals 11, 12. External terminal 11 is a positive-electrode terminal, and external terminal 12 is a negative-electrode terminal. As shown in FIG. 2, power storage device 10 includes a power storage module 100, a case 200, an insulating sheet 300, and a filling portion 400.

Figure 3:
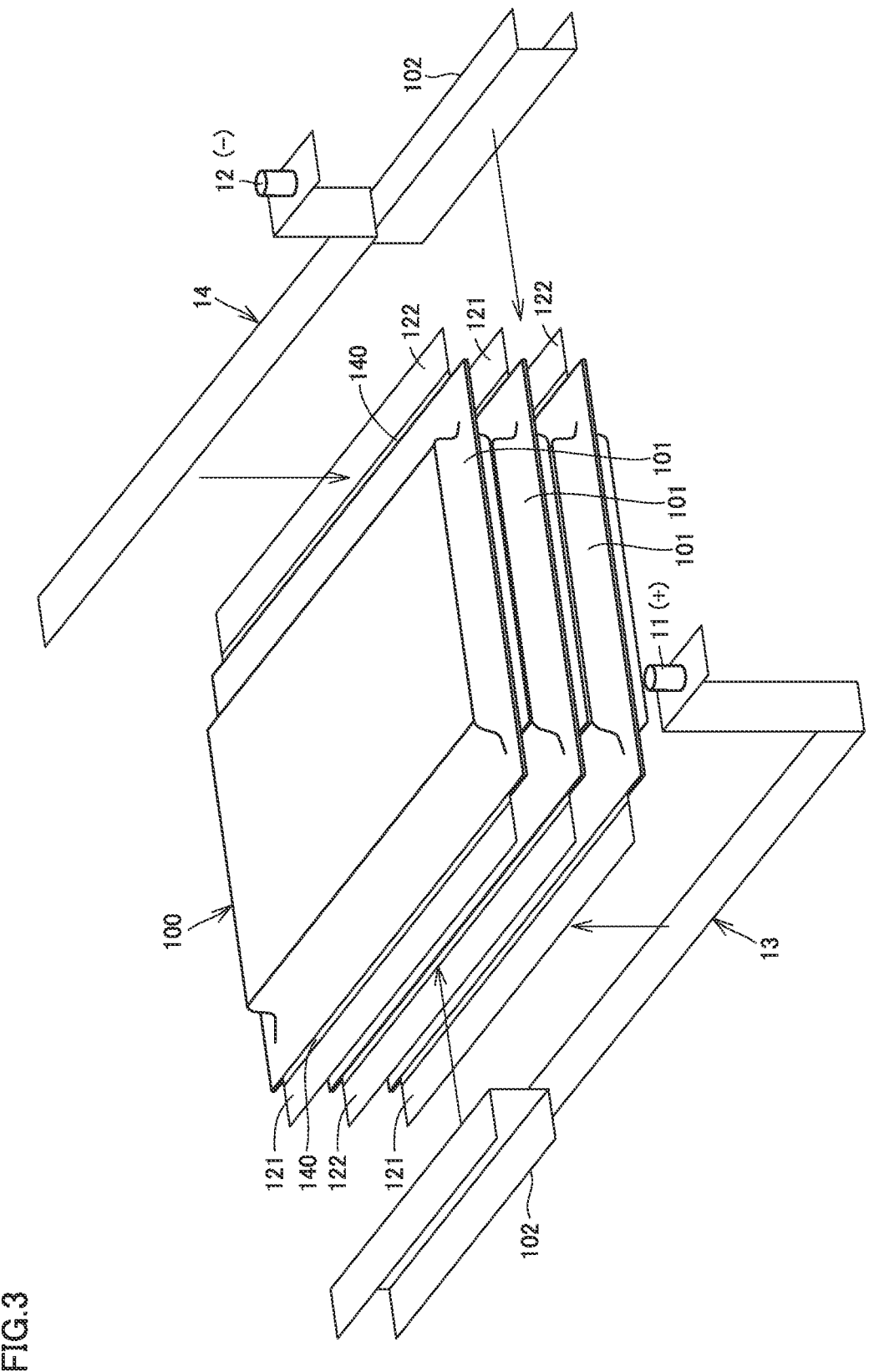
FIG. 3 is an exploded perspective view schematically showing a configuration of a power storage module.

FIG. 3 is an exploded perspective view schematically showing a configuration of a power storage module. As shown in FIGS. 2 and 3, power storage module 100 includes at least one power storage cell 101 and a plurality of bus bars 102.

In the present embodiment, power storage module 100 includes a plurality of power storage cells 101. Power storage cells 101 are stacked in one direction (the vertical direction in FIG. 1). Although FIGS. 2 and 3 show three power storage cells 101, the number of power storage cells 101 is not particularly limited. An example of power storage cell 101 is a lithium ion battery.

Power storage cell 101 is a so-called laminate-type cell. Specifically, power storage cell 101 includes a plurality of electrode bodies 110, a current collector plate 120, a laminated film 130, an adhesive member 140, and an electrolyte solution (not shown). Power storage cell 101 may be formed of an all-solid-state battery having a solid electrolyte in place of a separator and an electrolyte solution.

Electrode bodies 110 are stacked in one direction. Each of electrode bodies 110 includes a positive-electrode sheet 111, a negative-electrode sheet 112, and a separator 113 placed between positive-electrode sheet 111 and negative-electrode sheet 112. An end of positive-electrode sheet 111 and an end of negative-electrode sheet 112 are electrically connected to current collector plate 120.

Current collector plate 120 includes a positive-electrode current collector plate 120p connected with each positive-electrode sheet 111, and a negative-electrode current collector plate 120n connected with each negative-electrode sheet 112.

Positive-electrode current collector plate 120p is placed on one side of each sheet 111, 112 in an orthogonal direction orthogonal to a direction of stacking of positive-electrode sheets 111 and negative-electrode sheets 112 (the one direction). In the present embodiment, positive-electrode current collector plate 120p is shaped into a flat plate. Positive-electrode current collector plate 120p is made of, for example, aluminum. Positive-electrode current collector plate 120p includes a positive-electrode protrusion 121 shaped to protrude from laminated film 130 toward one side in the orthogonal direction.

Negative-electrode current collector plate 120n is placed on the other side of each sheet 111, 112 in the orthogonal direction. In the present embodiment, negative-electrode current collector plate 120n is shaped into a flat plate. Negative-electrode current collector plate 120n is made of, for example, copper. Negative-electrode current collector plate 120n includes a negative-electrode protrusion 122 shaped to protrude from laminated film 130 toward the other side in the orthogonal direction. Negative-electrode current collector plate 120n may be placed on the same side as the side on which positive-electrode current collector plate 120p is placed. In this case, negative-electrode current collector plate 120n is placed at a position at which negative-electrode current collector plate 120n is adjacent to positive-electrode current collector plate 120p in a direction orthogonal to both of the one direction and the orthogonal direction.

As shown in FIG. 2, power storage cells 101 are stacked such that positive-electrode protrusion 121 in one power storage cell 101 and negative-electrode protrusion 122 in power storage cell 101 adjacent to the one power storage cell 101 face each other in the one direction.

As shown in FIG. 3, positive-electrode protrusion 121 of power storage cell 101 placed at an end on one side in a direction is connected with a bus bar 13 provided with external terminal 11, and negative-electrode protrusion 122 of power storage cell 101 placed at an end on the other side in the direction is connected with a bus bar 14 provided with external terminal 12.

Laminated film 130 covers electrode bodies 110 and a part of current collector plate 120. More specifically, laminated film 130 covers positive-electrode sheets 111, negative-electrode sheets 112, separators 113, a part of positive-electrode current collector plate 120p, and a part of negative-electrode current collector plate 120n. Laminated film 130 is filled with an electrolyte solution (not shown).

Adhesive member 140 is a member that bonds laminated film 130 to each current collector plate 120p, 120n. Adhesive member 140 is made of an insulating material (such as a resin). Adhesive member 140 is shaped to protrude from laminated film 130. Specially, adhesive member 140 covers a part of positive-electrode protrusion 121 and a part of negative-electrode protrusion 122.

Bus bar 102 connects positive-electrode protrusion 121 and negative-electrode protrusion 122 that face each other such that power storage cells 101 are electrically connected in series. Bus bar 102 includes a positive-electrode contact portion 102a, a negative-electrode contact portion 102b, and a coupling portion 102c.

Positive-electrode contact portion 102a is shaped into a flat plate. Positive-electrode contact portion 102a is in surface contact with positive-electrode protrusion 121. Positive-electrode contact portion 102a is welded to positive-electrode protrusion 121.

Negative-electrode contact portion 102b is shaped into a flat plate. Negative-electrode contact portion 102b is in surface contact with negative-electrode protrusion 122. Negative-electrode contact portion 102b is welded to negative-electrode protrusion 122.

Coupling portion 102c couples positive-electrode contact portion 102a to negative-electrode contact portion 102b. Coupling portion 102c is shaped to extend in one direction (a direction in which positive-electrode protrusion 121 and negative-electrode protrusion 122 face each other). In the present embodiment, coupling portion 102c couples an inner end of positive-electrode contact portion 102a in the orthogonal direction to an inner end of negative-electrode contact portion 102b in the orthogonal direction. In other words, bus bar 102 is shaped to have an opening that opens outward in the orthogonal direction. This facilitates welding of positive-electrode contact portion 102a to positive-electrode protrusion 121 and welding of negative-electrode contact portion 102b to negative-electrode protrusion 122, from outside of power storage module 100 in the orthogonal direction.

Case 200 houses power storage module 100. Case 200 is made of a metal (such as aluminum). Case 200 includes a case body 210 and a closing plate 220, as shown in FIG. 1.

Case body 210 has an opening that opens in at least one direction. In the present embodiment, case body 210 is shaped into a square tube having a central axis extending in a direction orthogonal to a direction of stacking of power storage cells 101. Case body 210 is provided with an inlet h (see FIG. 2).

Closing plate 220 is welded to case body 210 so as to close the opening of case body 210. Closing plate 220 is shaped into a flat plate.

Cooling device 20 is provided to be in contact with an outer lateral surface of case body 210. In other words, cooling device 20 is provided to be in contact with case 200 in the direction orthogonal to the direction of stacking of power storage cells 101.

Insulating sheet 300 covers an inner surface of case body 210 and an inner surface of closing plate 220. Insulating sheet 300 may cover an upper surface and a lower surface of case body 210, as shown in FIG. 2.

Filling portion 400 is made of an insulating material. Preferably, filling portion 400 is made of a thermally conductive material. Filling portion 400 is formed by injecting the material (in the present embodiment, a potting material) into case 200 through inlet h of case 200.

Filling portion 400 covers the tip of positive-electrode protrusion 121 and the tip of negative-electrode protrusion 122, as shown in FIG. 2. Filling portion 400 entirely covers protrusion 121, 122 together with adhesive member 140. Filling portion 400 may cover adhesive material 140 and an end of laminated film 130.

Preferably, filling portion 400 entirely covers bus bars 102, 13, 14. Preferably, filling portion 400 is in contact with insulating sheet 300 provided on the inner surface of case body 210 and insulating sheet 300 provided on the inner surface of closing plate 220. As a result, a relative displacement of power storage module 100 to case 200 is reduced.

Power storage device 10 may further include a restriction unit 500, as shown in FIG. 2. Restriction unit 500 is placed between power storage module 100 and case body 210. Restriction unit 500 may be placed between a pair of power storage cells 101 adjacent to each other.

Restriction unit 500 restricts a relative displacement of power storage module 100 to case 200 in the direction of stacking of power storage cells 101. Restriction unit 500 is made of, for example, a material having dilatency characteristics. Specifically, when each power storage cell 101 is displaced relative to case 200 at a low velocity in the direction of stacking, such as when each power storage cell 101 expands, restriction unit 500 elastically deforms to absorb the expansion of each power storage cell 101. On the other hand, when each power storage cell 101 is displaced relative to case 200 at a relatively high velocity in the direction of stacking, such as when power storage device 10 vibrates, restriction unit 500 shows a relatively high modulus of elasticity to restrict a relative displacement of each power storage cell 101 to case 200. This reduces resonance of power storage module 100 when power storage device 10 vibrates.

In power storage device 10 of the present embodiment, since bus bar 102 is shaped to extend in one direction as describe above, the length of bus bar 102 in the one direction can be adjusted, thus accommodating changes in the length between positive-electrode protrusion 121 and negative-electrode protrusion 122 due to a change in the thickness of each power storage cell 101 in the direction of stacking. Consequently, a change in the thickness of each power storage cell 101 can be accommodated while providing commonality of shape between positive-electrode current collector plate 120p and negative-electrode current collector plate 120n.

In the present embodiment, current collector plate 120 and bus bar 102 are cooled by cooling device 20 via filling portion 400 made of a thermally conductive material from the lateral portion of case 200 in the direction orthogonal to the direction of stacking. Current collector plate 120 and bus bar 102 are made of metal, and accordingly, power storage module 100 is cooled effectively.

Embodiment 2

Figure 4:
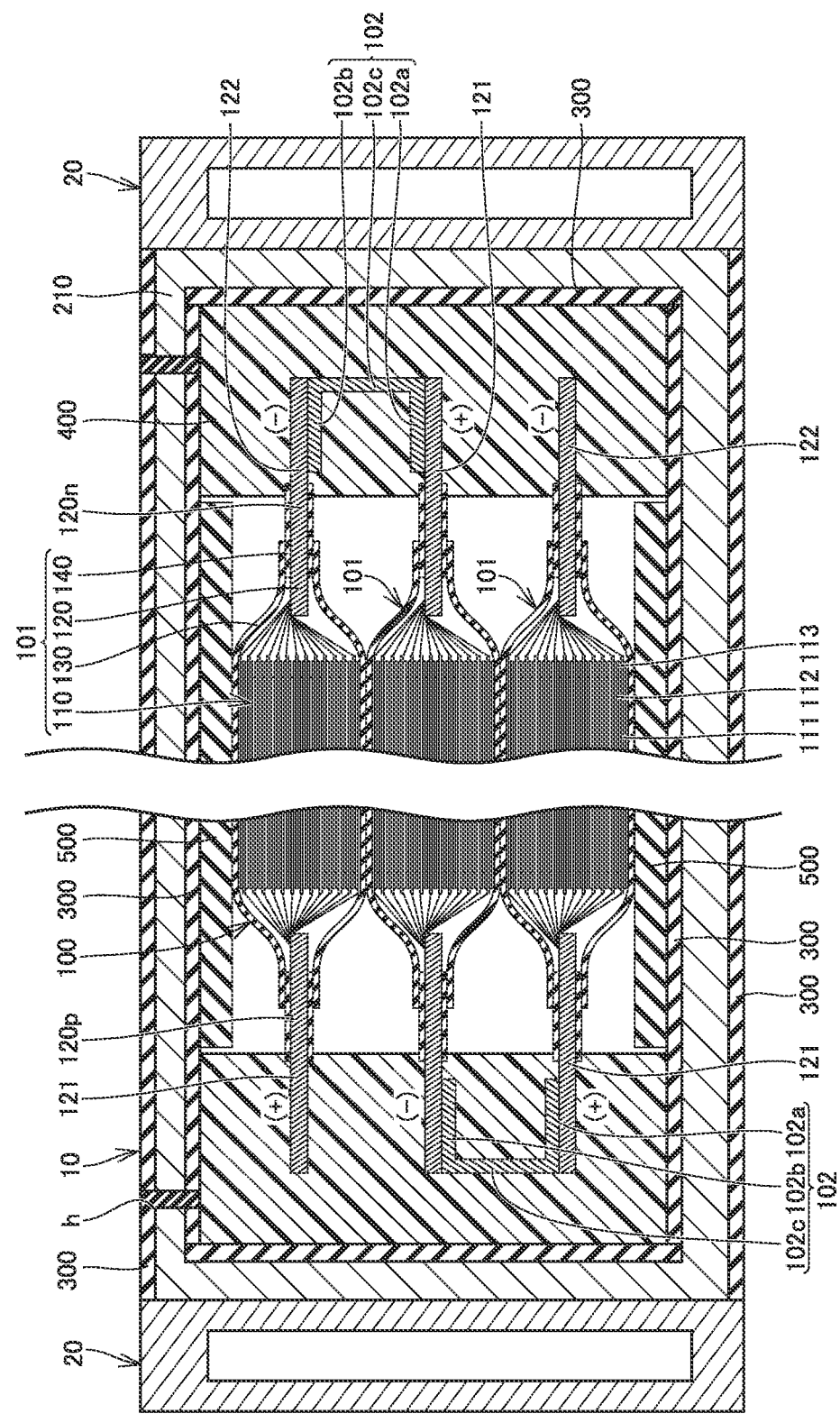
FIG. 4 is a sectional view schematically showing a configuration of a battery pack including a power storage device of Embodiment 2 of the present disclosure.
Figure 5:
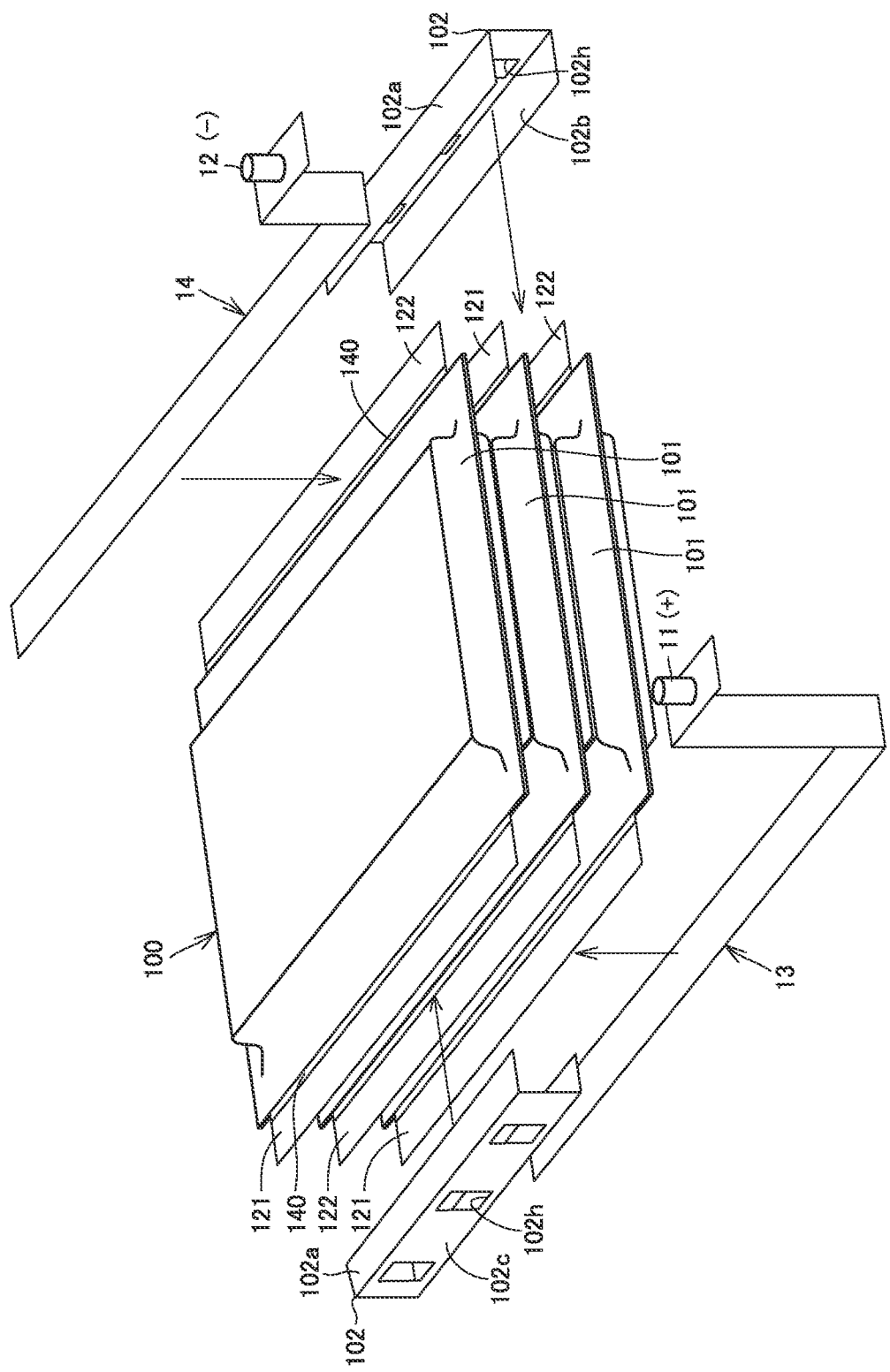
FIG. 5 is an exploded perspective view schematically showing a configuration of a power storage module in the power storage device of Embodiment 2 of the present disclosure.

Next, power storage device 10 of Embodiment 2 of the present disclosure will be described with reference to FIGS. 4 and 5. FIG. 4 is a sectional view schematically showing a configuration of a battery pack including a power storage device of Embodiment 2 of the present disclosure. FIG. 5 is an exploded perspective view schematically showing a configuration of a power storage module in the power storage device of Embodiment 2 of the present disclosure. Embodiment 2 will describe only a difference from Embodiment 1, and will not repeat the description on the same structure, and function and effect as those of Embodiment 1.

In the present embodiment, coupling portion 102c couples an outer end of positive-electrode contact portion 102a in the orthogonal direction to an outer end of negative-electrode contact portion 102b in the orthogonal direction. In other words, bus bar 102 is shaped to have an opening that opens inward in the orthogonal direction. In the present embodiment, positive-electrode contact portion 102a may be welded to any surface of positive-electrode protrusion 121, and negative-electrode contact portion 102b may be welded to any surface of negative-electrode protrusion 122.

As shown in FIG. 5, coupling portion 102c of bus bar 102 is provided with a through-hole 102h. Through through-hole 102h, positive-electrode contact portion 102a can be welded to positive-electrode protrusion 121 and negative-electrode contact portion 102b can be welded to negative-electrode protrusion 122, from outside of power storage module 100 in the orthogonal direction.

In this manner, the position of coupling portion 102c in the orthogonal direction is outside of that of Embodiment 1 in the orthogonal direction, leading to a smaller amount of the material (potting material) required for formation of filling portion 400 that is in contact with coupling portion 102c. As filling portion 400 is in contact with coupling portion 102c, a contact area between filling portion 400 and bus bar 102 increases, thereby increasing the efficiency of cooling each power storage cell 101.

Embodiment 3

Figure 6:
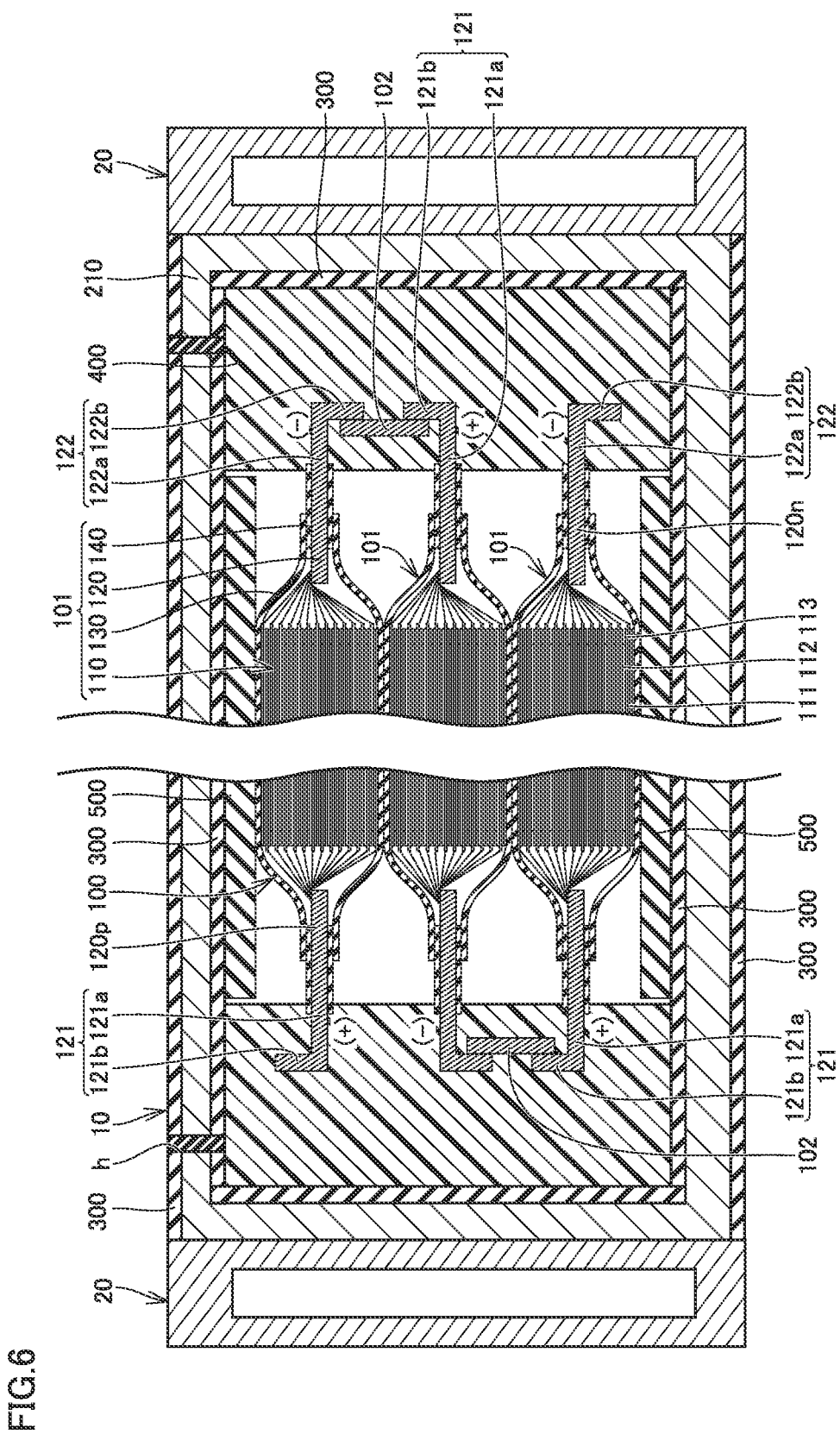
FIG. 6 is a sectional view schematically showing a configuration of a battery pack including a power storage device of Embodiment 3 of the present disclosure.

Power storage device 10 of Embodiment 3 of the present disclosure will be described below with reference to FIG. 6. FIG. 6 is a sectional view schematically showing a configuration of a battery pack including a power storage device of Embodiment 3 of the present disclosure. Embodiment 3 will describe only a difference from Embodiment 1, and will not repeat the description on the same structure, and function and effect as those of Embodiment 1.

In the present embodiment, positive-electrode protrusion 121 includes a positive-electrode projection 121a and a positive-electrode bent portion 121b, and negative-electrode protrusion 122 includes a negative-electrode projection 122a and a negative-electrode bent portion 122b.

Positive-electrode projection 121a is shaped to project toward one side in the orthogonal direction. Positive-electrode projection 121a is shaped into a flat plate.

Positive-electrode bent portion 121b is shaped to extend from an outer end of positive-electrode projection 121a in the orthogonal direction toward one side in the one direction. Positive-electrode bent portion 121b is shaped into a flat plate. Positive-electrode bent portion 121b is orthogonal to positive-electrode projection 121a.

Negative-electrode projection 122a is shaped to project to the other side in the orthogonal direction. Negative-electrode projection 122a is shaped into a flat plate.

Negative-electrode bent portion 122b is shaped to extend from an outer end of negative-electrode projection 122a in the orthogonal direction toward the other side in the one direction. In other words, negative-electrode bent portion 122b extends from negative-electrode projection 122a in the direction opposite to the direction in which positive-electrode bent portion 121b extends from positive-electrode projection 121a. Thus, negative-electrode bent portion 122b in one power storage cell 101 faces, in the one direction, positive-electrode bent portion 121b in a power storage cell 101 adjacent to the one power storage cell 101. Negative-electrode bent portion 122b is shaped into a flat plate. Negative-electrode bent portion 122b is orthogonal to negative-electrode projection 122a.

Bus bar 102 is shaped into a flat plate. Bus bar 102 connects positive-electrode bent portion 121b to negative-electrode bent portion 122b with being in surface contact with both of positive-electrode bent portion 121b and negative-electrode bent portion 122b. Bus bar 102 is in contact with the inner lateral surface of each bent portion 121b, 122b in the orthogonal direction. Bus bar 102 is welded to positive-electrode bent portion 121b and negative-electrode bent portion 122b.

In Embodiment 3, bus bar 102 may be in contact with the outer lateral surface of each bent portion 121b, 122b in the orthogonal direction.

It will be appreciated by a person skilled in the art that the exemplary embodiments described above provide specific examples of the following aspects.

A power storage device in the embodiment described above includes a plurality of power storage cells stacked in one direction, and a bus bar that electrically connects power storage cells of the plurality of power storage cells to each other. Each of the power storage cells includes a plurality of positive-electrode sheets stacked in the one direction, a plurality of negative-electrode sheets stacked in the one direction, a positive-electrode current collector plate connected to the plurality of positive-electrode sheets, a negative-electrode current collector plate connected to the plurality of negative-electrode sheets, and a laminated film covering the plurality of positive-electrode sheets, the plurality of negative-electrode sheets, a part of the positive-electrode current collector plate, and a part of the negative-electrode current collector plate. The positive-electrode current collector plate includes a positive-electrode protrusion shaped to protrude from the laminated film in an orthogonal direction orthogonal to the one direction. The negative-electrode current collector plate includes a negative-electrode protrusion shaped to protrude from the laminated film in the orthogonal direction. The plurality of power storage cells are stacked such that the positive-electrode protrusion in one power storage cell among the plurality of power storage cells and the negative-electrode protrusion in another power storage cell adjacent to the one power storage cell among the plurality of power storage cells face each other in the one direction. The bus bar is shaped to extend in the one direction and connects the positive-electrode protrusion to the negative-electrode protrusion.

In this power storage device, since the bus bar is shaped to extend in one direction, the length of the bus bar in the one direction can be adjusted, thus accommodating changes in the length between the positive-electrode protrusion and the negative-electrode protrusion due to the change in the thickness of each power storage cell in the direction of stacking. Thus, the change in the thickness of each power storage cell can be accommodated while providing commonality of shape among the positive-electrode current collector plate and the negative-electrode current collector plate.

The positive-electrode protrusion and the negative-electrode protrusion may be each shaped into a flat plate orthogonal to the one direction. The bus bar may include a positive-electrode contact portion that is in surface contact with the positive-electrode protrusion, a negative-electrode contact portion that is in surface contact with the negative-electrode protrusion, and a coupling portion shaped to extend in the one direction and coupling the positive-electrode contact portion to the negative-electrode contact portion.

In this case, the coupling portion may couple an inner end of the positive-electrode contact portion in the orthogonal direction to an inner end of the negative-electrode contact portion in the orthogonal direction.

The positive-electrode protrusion may include a positive-electrode projection projecting in the orthogonal direction, and a positive-electrode bent portion shaped to extend from an outer end of the positive-electrode projection in the orthogonal direction toward one side in the one direction. The negative-electrode protrusion may include a negative-electrode projection projecting in the orthogonal direction, and a negative-electrode bent portion shaped to extend from an outer end of the negative-electrode projection in the orthogonal direction toward an another side in the one direction. The bus bar may be shaped into a flat plate and connect the positive-electrode bent portion to the negative-electrode bent portion while being in surface contact with both of the positive-electrode bent portion and the negative-electrode bent portion.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery pack comprising: a power storage device; a cooling device, wherein the power storage device includes: a plurality of power storage cells stacked in one direction; a case made of a metal and housing the plurality of power storage cells; a filling portion made of an insulating and a thermally conductive material and filled in the case; and a bus bar that electrically connects power storage cells of the plurality of power storage cells to each other, wherein each of the power storage cells includes: a plurality of positive-electrode sheets stacked in the one direction, a plurality of negative-electrode sheets stacked in the one direction, a positive-electrode current collector plate connected to the plurality of positive-electrode sheets, a negative-electrode current collector plate connected to the plurality of negative-electrode sheets, and a laminated film covering the plurality of positive-electrode sheets, the plurality of negative-electrode sheets, a part of the positive-electrode current collector plate, and a part of the negative-electrode current collector plate, the positive-electrode current collector plate includes a positive-electrode protrusion shaped to protrude from the laminated film in an orthogonal direction orthogonal to the one direction, the negative-electrode current collector plate includes a negative-electrode protrusion shaped to protrude from the laminated film in the orthogonal direction, the plurality of power storage cells are stacked such that the positive-electrode protrusion in one power storage cell among the plurality of power storage cells and the negative-electrode protrusion in another power storage cell adjacent to the one power storage cell among the plurality of power storage cells face each other in the one direction, and the bus bar is shaped to extend in the one direction and connects the positive-electrode protrusion to the negative-electrode protrusion, the positive-electrode protrusion and the negative-electrode protrusion are each shaped into a flat plate orthogonal to the one direction, and the bus bar includes a positive-electrode contact portion that is in surface contact with the positive-electrode protrusion, a negative-electrode contact portion that is in surface contact with the negative-electrode protrusion, and a coupling portion shaped to extend in the one direction and couple an outer end of the positive-electrode contact portion to an outer end of the negative-electrode contact portion in the orthogonal direction, wherein the coupling portion includes a plurality of through-holes spaced apart and arranged at intervals in a direction orthogonal to both the one direction and the orthogonal direction, wherein the case has an opposing wall with an inner surface that faces an outer surface of the coupling portion in the orthogonal direction, wherein the cooling device is in contact with an outer surface of the opposing wall, and wherein the filling portion is in direct contact with each of: the positive-electrode protrusion, the negative-electrode protrusion, the positive-electrode contact portion, the negative-electrode contact portion, an inner surface and the outer surface of the coupling portion in the orthogonal direction, and an insulating sheet provided on the inner surface of the opposing wall of the case.

\* \* \* \* \*